(12) United States Patent
Brown

(10) Patent No.: US 11,417,924 B1
(45) Date of Patent: Aug. 16, 2022

(54) REFUELABLE ELECTROCHEMICAL BATTERY

(71) Applicant: Wendell D. Brown, Henderson, NV (US)

(72) Inventor: Wendell D. Brown, Henderson, NV (US)

( * ) Notice: Subject to any disclaimer, the term of this patent is extended or adjusted under 35 U.S.C. 154(b) by 0 days.

(21) Appl. No.: 17/087,497

(22) Filed: Nov. 2, 2020

Related U.S. Application Data

(63) Continuation-in-part of application No. 16/365,020, filed on Mar. 26, 2019, now Pat. No. 10,826,143, which is a continuation of application No. 15/496,998, filed on Apr. 25, 2017, now Pat. No. 10,283,825, which is a continuation of application No. 14/295,238, filed on Jun. 3, 2014, now Pat. No. 9,666,919.

(60) Provisional application No. 61/830,449, filed on Jun. 3, 2013.

(51) Int. Cl.
| | |
|---|---|
| *H01M 12/06* | (2006.01) |
| *H01M 12/08* | (2006.01) |
| *H01M 8/04276* | (2016.01) |
| *H01M 50/60* | (2021.01) |
| *H01M 50/77* | (2021.01) |
| *H01M 50/691* | (2021.01) |

(52) U.S. Cl.
CPC ....... *H01M 12/06* (2013.01); *H01M 8/04276* (2013.01); *H01M 12/08* (2013.01); *H01M 50/60* (2021.01); *H01M 50/691* (2021.01); *H01M 50/77* (2021.01); *H01M 2300/0014* (2013.01); *Y02E 60/10* (2013.01)

(58) Field of Classification Search
CPC .. H01M 8/04276; H01M 12/06; H01M 50/60; H01M 50/691; H01M 50/77
USPC ........................................................ 429/404
See application file for complete search history.

(56) References Cited

U.S. PATENT DOCUMENTS

| | | | |
|---|---|---|---|
| 8,338,045 B2 * | 12/2012 | Sarata ..................... | C01B 3/065 429/444 |
| 2016/0276649 A1 * | 9/2016 | Turney ..................... | H01M 4/52 |

FOREIGN PATENT DOCUMENTS

CN 206163614 U * 5/2017

* cited by examiner

*Primary Examiner* — James M Erwin
(74) *Attorney, Agent, or Firm* — Park, Vaughan, Fleming & Dowler LLP

(57) ABSTRACT

A refuelable electrochemical battery or cell is provided that features three phases of operation that repeat cyclically. In an intake phase, electrochemically active particles that are at least partially magnetic and a suitable electrolyte are admitted or fed into a cell cavity. In a power phase, oxidation and reduction reactions produce electrical energy while an electromagnet and/or permanent magnet attract the particles toward one electrode. A gas-diffusion membrane permeable by oxygen operates in conjunction with another electrode. During the exhaust phase, a piston forces residue of the reaction from the cavity to prepare for the next cycle of operation.

20 Claims, 13 Drawing Sheets

Refuelable Electrochemical Cell 1000

Refuelable Electrochemical Cell 1100

REFUELABLE ELECTROCHEMICAL BATTERY

RELATED APPLICATION

This application is a continuation-in-part of U.S. patent application Ser. No. 16/365,020 (the '020 application), which was filed Mar. 26, 2019 and issued Nov. 3, 2020 as U.S. Pat. No. 10,826,143. The '020 application is a continuation of U.S. patent application Ser. No. 15/496,998 (the '998 application), which was filed Apr. 25, 2017 and issued May 7, 2019 as U.S. Pat. No. 10,283,825. The '998 application is a continuation of U.S. patent application Ser. No. 14/295,238, which was filed Jun. 3, 2014 and issued May 30, 2017 as U.S. Pat. No. 9,666,919. This application also claims priority to U.S. Provisional Patent Application No. 61/830,449, which was filed Jun. 3, 2013. The preceding patent applications and provisional patent application are incorporated herein by reference.

BACKGROUND

A refuelable electrochemical battery (or cell) and methods of refueling a refuelable electrochemical battery or cell are provided.

Primary and secondary types of batteries or cells have long been used as power sources. A primary battery is generally meant for one-time use, is not rechargeable, and may or may not be recycled. A secondary battery is rechargeable via a process in which the electrochemical process by which electrical energy was generated within the battery is reversed. For example, some lithium-ion and nickel-cadmium batteries can be recharged by applying an electrical current.

In addition, reconstructable metal/air batteries have been developed that take advantage of the high energy density of some metals (e.g., zinc), but they must be removed from the equipment they power in order to be refueled and refurbished. For example, Cooper (U.S. Pat. No. 5,434,020) provides a zinc/air battery that must be uninstalled and processed in order to replace the expended metal particles.

Other metal/air batteries or fuel cells are refillable via a process or processes that rely upon gravity to ensure proper settling of the metal particles and formation of the metal electrode. For example, Gutierrez (U.S. Pat. No. 6,162,555) provides for feeding particles into cell cavities via flows shaped parallel to the cavities. However, these types of batteries are vulnerable to decreased efficiency resulting from clogging of valves, pores, and/or other conduits designed to allow circulation of the particles and/or an electrolyte. In particular, as some particles are expended, a sludge or paste tends to be formed that can prevent further or complete oxidation of the remaining particles. Attempts have been made to avoid this problem, but still rely upon the force of gravity to combine the metal particles.

Existing metal/air batteries that rely upon gravity to feed metal particles into a cell are vulnerable to loss of power and/or decreased efficiency if they are disturbed or oriented such that gravity acts against the necessary flow of the particles or electrolyte.

SUMMARY

In some embodiments, a refuelable electrochemical cell or battery is provided that employs one or more forces that act instead of gravity, or in addition to gravity, to aggregate or gather electrochemically active (e.g., metal) particles to facilitate the oxidation reaction necessary to promote the flow of a current. A gas-diffusion membrane that is permeable to oxygen (e.g., an air cathode) may facilitate the corresponding reduction reaction. The particles are delivered to the cell or a cell chamber mixed with or possibly suspended within a suitable electrolyte.

Operation of a refuelable electrochemical cell or battery may involve three distinct stages. An intake stage involves pumping or drawing the fuel (i.e., the electrolyte/particle mixture) into a cell. A power stage commences after the cell is at least partially filled, as the applied force or forces combine or collect the particles and an electrical current is formed by the oxidation-reduction reaction(s). An exhaust stage is initiated when the current fails or falls below a threshold level, involves expulsion of the spent electrolyte (and some or all remaining particulate matter), and terminates with initiation of another intake stage.

In one or more embodiments, mechanical force or forces are used to gather the electrochemically active particles. For example, one or more collecting components (which may comprise or be coupled to a current collector) may sweep through the fuel mixture, and may be perforated (e.g., as a mesh or screen) to allow the electrolyte to pass through while the particles are collected.

In one or more embodiments, the electrochemically active particles are gathered via magnetism. In these embodiments an electromagnet that is powered during the power stage, possibly by the battery/cell itself or by a different battery/cell, attracts the particles to or toward a current collector (e.g., at an anode). Homogeneous and/or heterogeneous particles may be used. Illustrative homogeneous particles include pellets, grains, lumps or other pieces of iron, ferritic steel or other suitably magnetic substance; illustrative heterogeneous particles include particles that are partially magnetic and partially non-magnetic or semi-magnetic. For example, a heterogeneous particle may feature a magnetic core (e.g., iron or steel) with an exterior of another substance (e.g., a coating of aluminum, zinc, or lithium). In some alternative embodiments, a permanent magnet is used instead of (or in addition to) an electromagnet and may be of any suitable type, such as aluminum-nickel-cobalt (alnico), strontium-iron (ferrite or ceramic), or rare earth (e.g., neodymium-iron-boron or samarium-cobalt).

In one or more embodiments, instead of a gas-permeable cathode through which oxygen may access a cell and interact with the electrochemical fuel, material that is relatively electronegative (e.g., oxidized or pre-oxidized material) is added to the fuel before or during the intake phase, in addition to the consumable electrochemically active particles. For example, a compound of oxygen such as iron oxide, silicon dioxide, aluminum oxide, calcium carbonate, magnesium oxide, manganese oxide, sulfur trioxide crystals, nitrogen dioxide (e.g., in liquid form), and so on, may be used as a source of oxygen.

In one or more embodiments, electrochemically active fuel is delivered to a refuelable electrochemical cell or battery in the form of patches or other areas laminated onto a film, ribbon or other non-conductive medium. The film is advanced such that one or more of the fuel patches or areas are in contact with an electrolyte, and are near or in contact with a current collector or electrode during each power phase.

DETAILED DESCRIPTION

Figure 1:
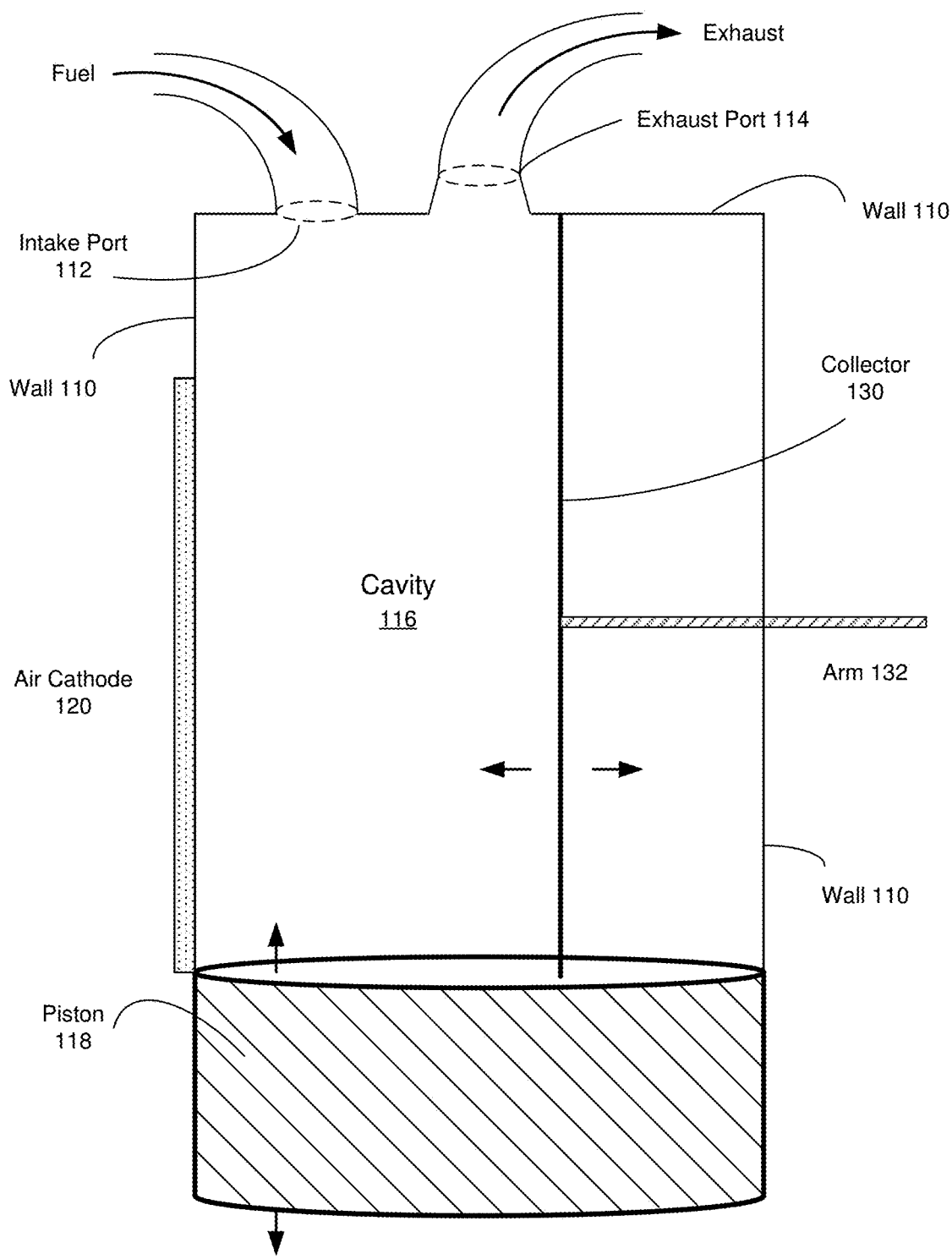
FIG. 1 is a front view of a refuelable electrochemical cell or battery, in accordance with some embodiments.

The following description is presented to enable any person skilled in the art to make and use the invention. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown.

Overview

In some embodiments, a refuelable electrochemical battery is provided. The battery is refuelable in place, meaning that it need not be removed from its operating position in order to be refueled. In these embodiments, the battery is refueled with a mixture that comprises electrochemically active particles and a suitable electrolyte. In an illustrative implementation, the particles are pellets (or grains, flakes, balls, etc.) of aluminum, zinc, or some other metal having relatively high energy density, while the electrolyte may be sodium hydroxide or potassium hydroxide. In other implementations, the particles may be any of various other elements, minerals, or compounds, and the electrolyte may be any other suitable electrolyzing substance (e.g., saltwater, vinegar), which may be liquid, semi-liquid (e.g., paste), or solid (e.g., powder) form.

In some embodiments, operation of a refuelable electrochemical battery involves three stages or phases: intake, power, and exhaust. During the intake stage, the fuel is drawn or pumped into a cavity through an intake port. During the power stage, the battery produces electrical energy, possibly on the order of magnitude of 1000 watt-hours per kilogram of fuel or electrochemically active material. During the exhaust phase the spent electrolyte and residue (e.g., zincate, aluminum oxide) is expelled through an exhaust port in order to prepare for another intake stage.

In these embodiments, the electrochemically active particles are aggregated or combined to form one electrode (e.g., the anode) or part of one electrode, or to gather them toward one electrode, while the other electrode (e.g., the cathode) is an oxygen-permeable gas-diffusion membrane (e.g., an air cathode) that may be in contact (on one surface) with the fuel and that therefore allows oxygen to enter the cavity and react with the fuel. Conductive transfer plates, ribs, struts, wires or other means (e.g., a mesh of nickel, platinum, or other conductive metal) may be used to assist the current flow with or within the air cathode.

A Refuelable Electrochemical Battery or Cell that Employs Mechanical Force

Instead of relying upon gravity to pack the particles into a chemically active or reactive orientation, in some embodiments mechanical means are used to collect them and force them near or into contact with an electrode (e.g., anode) current collector. In some implementations, for example, a current collector component of the battery starts physically collecting the electrochemically active particles after or at the end of the intake phase, in order to facilitate the power phase. As the particles dissolve, the collector may continue to apply pressure to the remaining particles in order to support continued power generation. At the end of the power phase, the collector retracts or withdraws to allow the exhaust phase to proceed. The collector may comprise a plunger, a gate, an arm, a brush, a wedge, a lever, and/or some other means that mechanically gathers or collects the electrochemically active particles.

In some other implementations, a battery/cell or a battery/cell cavity may rotate during operation (i.e., during the power phase), with sufficient velocity to aggregate or force heavier electrochemically active particles (e.g., those that have dissolved less) to the outer wall(s) of the cavity due to centrifugal force. The residue may thereby be forced into the central portion, from which it may be expelled or extracted. In some implementations, the rotation may assist with expulsion of the residue during the exhaust phase.

In some embodiments, the same or different mechanical means used to collect the electrochemically active particles may operate to empty the cavity during the exhaust phase. For example, a piston or piston-like component may physically force the residue from the battery cavity, and retract to allow or even facilitate refilling of the cavity with fresh fuel.

In some embodiments, the fuel is a suspension in which the electrochemically active particles are on the order of a given average diameter (e.g., 1-5 mm) and are dispersed within the liquid electrolyte. In these embodiments, assuming approximately uniform distribution of the particles in the liquid, pumping a given volume of the fuel into the battery cavity will ensure an appropriate ratio of electrolyte to electrochemically active particles. In other embodiments, the electrochemically active particles are larger (e.g., 10 mm) and, instead of being uniformly dispersed within the electrolyte, may naturally aggregate at the bottom of whatever vessel contains the fuel. In these embodiments, an appropriate proportion of electrochemically active substance to electrolyte may be ensured by separately feeding the electrolyte and the particles to the battery, or by pre-combining them in appropriate amounts prior to (or during) each intake phase.

Due in part to the manner in which the electrochemical battery is refueled or replenished, it may be termed an "electrical generator," an "electromechanichemical engine," a "tertiary cell" (to differentiate it from primary and secondary cells), or may be given some other moniker that reflects its ability to generate electrical energy from an electrochemical process that employs some force other than or in addition to gravity (e.g., mechanical force, magnetism) and that is refuelable in place.

In some embodiments, a refuelable electrochemical battery provided herein comprises multiple cells or cavities, such as a bipolar battery in which electrodes or terminals are connected in series or in parallel. In addition, multiple separate cells, batteries or battery packs may be provided for powering a load, wherein at least one battery supports one or more other batteries by powering their mechanical components, powering the intake and exhaust phases, facilitating a transition from powering the load from one collection of batteries/cells to powering the load from a different collection of cells, etc. A combination of multiple batteries may, for example, be formed into two-dimensional or three-dimensional array, depending on weight limits, available space, battery size, etc.

A load that is powered by a refuelable electrochemical battery may be any type of device or equipment that operates on electrical energy. Illustratively, if the load is an engine for a vehicle that contains the battery, it may be periodically driven to a refueling station that refills a storage tank of the vehicle with fuel and that may receive accumulated residue (e.g., for processing into additional fuel).

FIG. 1 is a diagram of a refuelable electrochemical battery that employs mechanical force, according to some embodiments.

Figure 2:
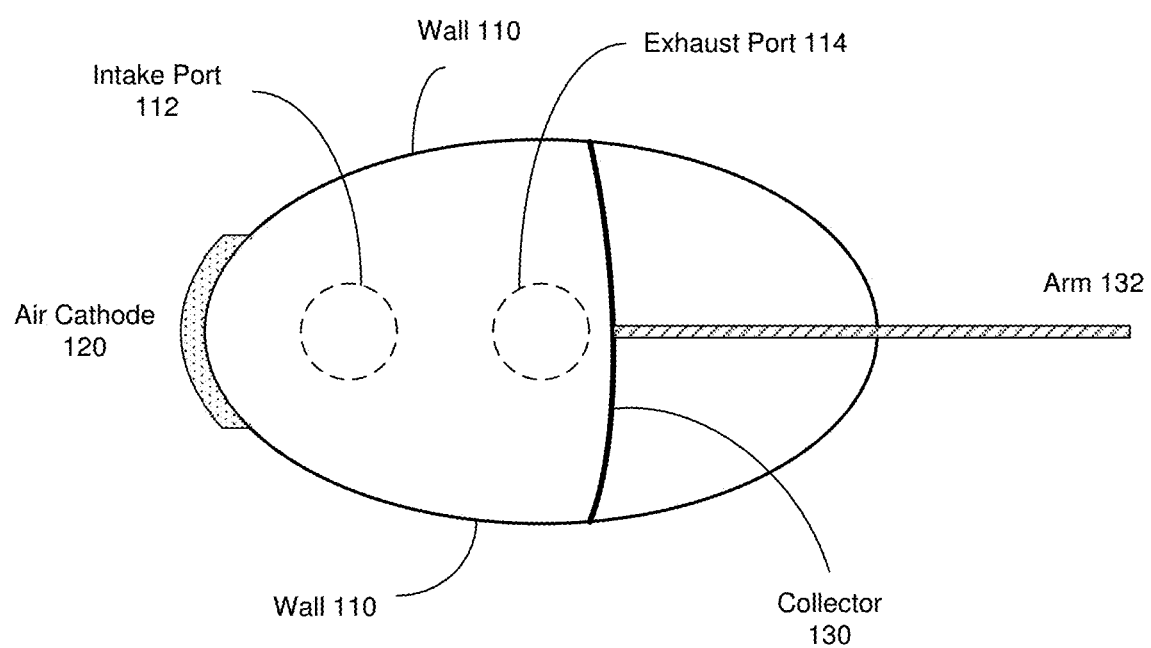
FIG. 2 is a top view of the refuelable electrochemical cell or battery of FIG. 1, in accordance with some embodiments.

In these embodiments, battery or cell 100 comprises cavity 116 defined by walls 110, and is generally cylindrical in shape (e.g., ellipsoidal (as shown in FIG. 2), circular). The intake phase of operation of battery 100 is marked by a flow of fuel into cavity 116 through intake port 112, from a storage tank or other repository. Conversely, the exhaust phase is marked by the expulsion of residue through exhaust port 114. Piston 118 assists in the expulsion of the residue. In some implementations, the upper wall of the battery (which hosts ports 112, 114) slopes slightly (e.g., upward) to assist in the evacuation of cavity 116; in other implementations, and as shown in FIG. 1, the exhaust port is offset from the upper wall in addition to or instead of a sloping upper wall.

Cathode 120 is oxygen-permeable, from an air side external to battery 100 and into cavity 116, wherein the oxygen can react with the fuel mixture to feed the electrochemical action. Thus, one (interior) surface of cathode 120 forms part of wall 110, and may be wetted or wettable by the fuel mixture, or may comprise a hydrophobic or other type of separator to prevent the passage of liquid. In some implementations, for example, an insulating separator (e.g., a wettable fabric) covers the interior surface of cathode 120 but does not impede (or does not significantly impede) the current flow. One or more conductive components (e.g., plates, ribs, struts, strips, ribbons, wires) may assist current flow toward/through the cathode.

Collector 130, which is connected to arm 132 for extending or retracting the collector, is shown in a partially deployed or extended orientation. As is more clearly shown in another figure, the collector may comprise a flexible and relatively sturdy mesh or perforated surface through which the liquid electrolyte can pass, but which collects electrochemically active particles that are larger than the perforations.

In some implementations, collector 130 is metallic and acts as a current collector or electrode. In some other implementations and as indicated above, a similar or compatible (anode) current collector is provided in the form of a plate, a mesh, or other conductive transfer surface(s) situated adjacent to and in contact with a porous insulating separator that, in turn, covers air cathode 120 (internal to battery 100). Thus, the (anode) current collector(s) collects electrical charges emitted by the electrochemically active particles as they oxidize. Although not shown in FIG. 1, one (positive) lead or terminal may be coupled to or embedded within air cathode 120, and another (negative) lead or terminal may be coupled to collector 130, arm 132, or other anode current collector or transfer entity that near or in contact with the electrochemically active particles.

During the intake phase of battery 100, piston 118 withdraws from the upper wall or is already in the retracted position shown in FIG. 1 before the intake phase begins. After cavity 116 has been (substantially) filled with fuel, or a sufficient amount of fuel has been introduced into cavity 116, piston 118 is in the position shown in FIG. 1 and collector 130 extends toward air cathode 120 in order to sweep the electrochemically active particles of the fuel toward the cathode and to place them in contact with a current collector or transfer component.

After a predetermined period of time, or after the electrical output of the battery fails or falls below a predetermined level, or upon some other trigger, collector 130 retracts to and/or flush with a wall 110. For example, the collector may retract until it lies within a recess in the wall through which arm 132 extends (not shown in FIG. 1). The exhaust phase then commences with piston 118 moving upward (in the embodiments reflected in FIG. 1) to force the residue and any remaining fuel from cavity 116, after which another intake phase begins.

In some implementations, collector 130 extends and retracts in response to extension and retraction of arm 132 (e.g., a screw, a rod), which may be powered by the same or a different battery or cell. In other implementations, instead of arm 132, which may pierce a wall 110 of the battery, means for extending and retracting collector 130 may be internal to the battery, such as a mechanism similar to a scissors lift. In other implementations, a collector component has a different form altogether (e.g., one or more movable gates or panels).

In yet another implementation, multiple arms 132 are used to make contact with and support multiple areas of collector 130 instead of a single joint where arm 132 meets collector 130 in FIG. 1. In a further implementation, arm 132 has a greater height or vertical dimension so that instead of applying mechanical force on a small area of collector 130, it contacts the collector along more (e.g., the majority) of the collector's height, and may be envisioned as a wall that is orthogonal to collector 130 instead of an arm.

In some embodiments, instead of gathering the particles toward cathode 120, collector 130 gathers them toward a different wall, such as wall 110 across from the air cathode, which may contain a corresponding electrode (e.g., an anode) for collecting the electrical charge. In these embodiments, arm 132 extends collector 130 to or toward air cathode 120 after the exhaust phase and before the intake phase. After the fuel is received into cavity 116, the arm and the collector draw the particles toward the anode. When the collector is able to retract to its resting position (e.g., flush with or retracted into the wall), the power phase may be considered complete.

Some components of a refuelable electrochemical battery, or of a battery system or apparatus, are omitted from FIG. 1. For example, a digital processor may be coupled to the battery or cell to control its operation, wires or other conductors may carry or convey the electrical current, a piston rod or other connecting element may couple piston 118 to a cam or other mechanism for extending and retracting the piston, etc. Illustratively, an exterior casing of battery 100 (e.g., including walls 110) may be constructed of a heavy-duty plastic or metallic material.

Figure 3:
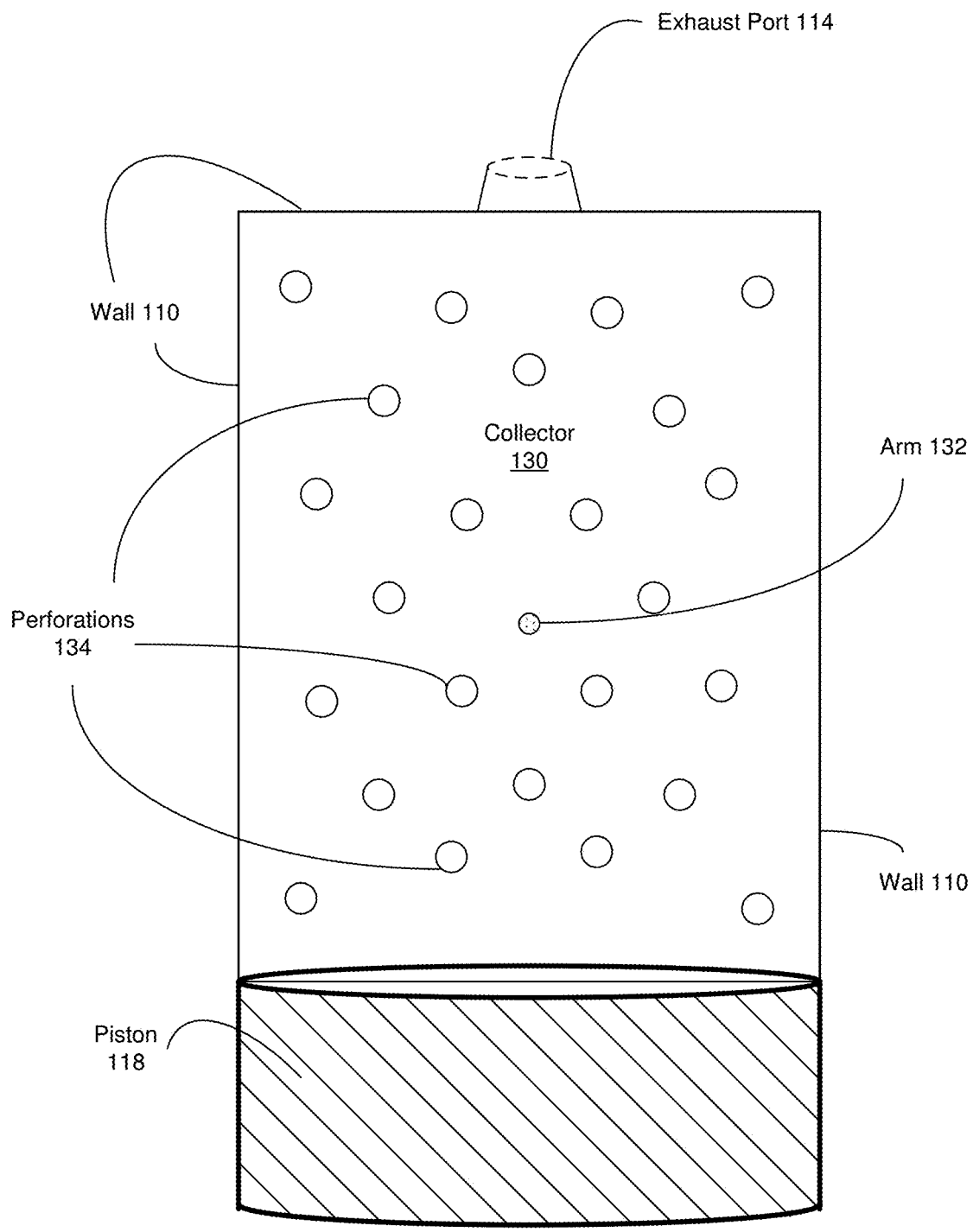
FIG. 3 is a right-side view of the refuelable electrochemical cell or battery of FIG. 1, in accordance with some embodiments.

FIGS. 2 and 3 are top and right-side views, respectively, of the refuelable electrochemical battery of FIG. 1, according to some embodiments.

FIG. 2 shows air cathode 120 adjacent to or forming a portion of the surface of a wall 110, and may extend for any portion of the vertical height of the battery. Generally, however, and as shown in FIG. 1, a bottom edge of cathode 120 is aligned with or near a top edge or surface of piston 118 when the piston is retracted as shown in FIG. 1. The dimensions of the gas-diffusion membrane of air cathode 120 may vary from one implementation to another, depending on the necessary transfer rate of oxygen for example.

Also as shown in FIG. 2, flexible collector 130 may have dimensions such that it is approximately fully extended vertically and horizontally (in a substantially rectangular shape) when it is located near the midpoint of the battery's cavity. Illustratively, it may bend to conform to the contour of the interior surface of the battery as it extends or retracts, such that it may have a convex aspect when fully extended (or retracted) and a concave aspect when fully retracted (or extended). In some embodiments, cavity 116 may feature horizontal groves and edges of collector 130 may feature extensions (e.g., tabs, fingers) that ride in the grooves (or vice versa) to guide the collector during extension/retraction. In some embodiments in which the collector component acts as a current collector, it may transfer that current through conductive ribs or guides within the grooves and to another current collector, which may be near cathode 120 or may be elsewhere (e.g., near the opposing wall). Current collected by the collector may be conducted in other ways in other embodiments.

As shown in FIG. 3, collector 130 of battery 100 is perforated to allow electrolyte to pass through it as it collects the electrochemically active particles. It may be noted that the average diameter of perforations 134 may be (substantially) smaller than the average diameter of the particles, so as to ensure collection of virtually all of the particles.

In some embodiments, a battery cavity may have a rectangular cross-section, in which case collector 130 of FIGS. 1-3 may be rigid, of dimensions that are compatible with the interior of the cavity, and may maintain a uniform aspect as it is extended and retracted.

Figure 4A:
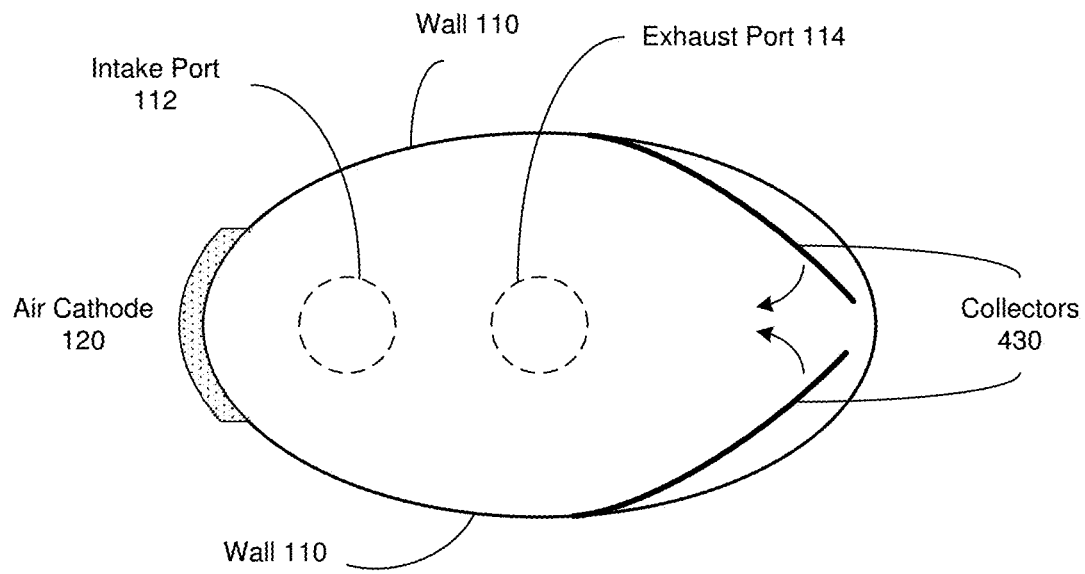
FIGS. 4A-B are top views of a refuelable electrochemical cell or battery in accordance with some embodiments.
Figure 4B:
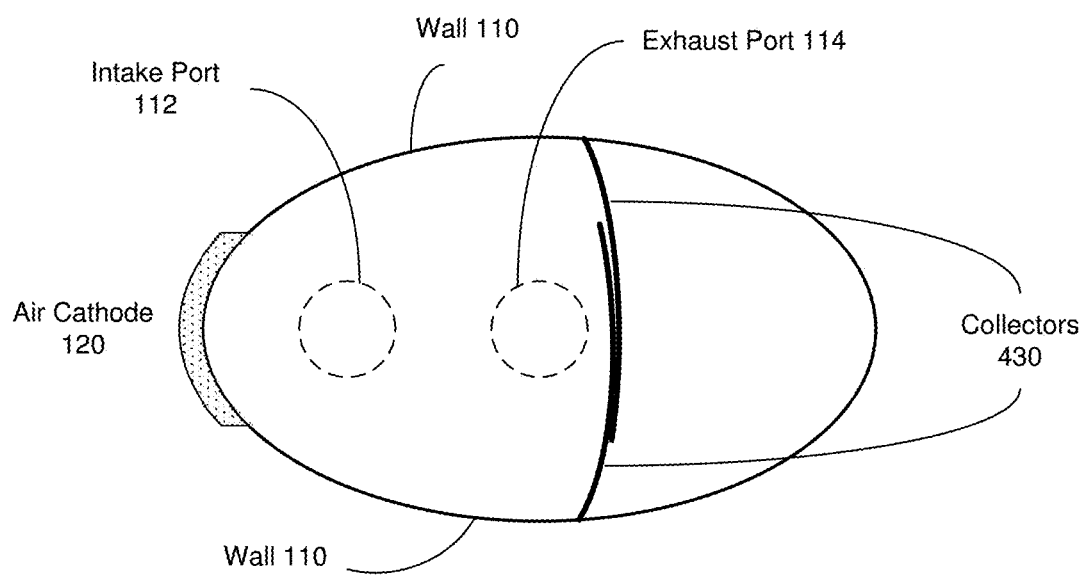

FIGS. 4A-B are top views of a refuelable electrochemical battery according to some embodiments. In these embodiments, the collector component is implemented as a pair of gates 430 that sweep the electrochemically active particles together as they are deployed/extended. In FIG. 4A, the collectors are connected to pivots (not shown) in opposing walls 110, and have just begun to deploy from the positions they assume during the intake and exhaust phases, wherein they are flush or nearly flush with walls of the battery. In FIG. 4B, the collector gates are partially deployed (or fully deployed in some implementations).

In other embodiments, the gates are installed on other walls. For example, one gate may have a resting position flush with the top surface of piston 118, while another gate has a resting position flush with the interior surface of a side wall of the battery or retracted into the wall.

Figure 6A:
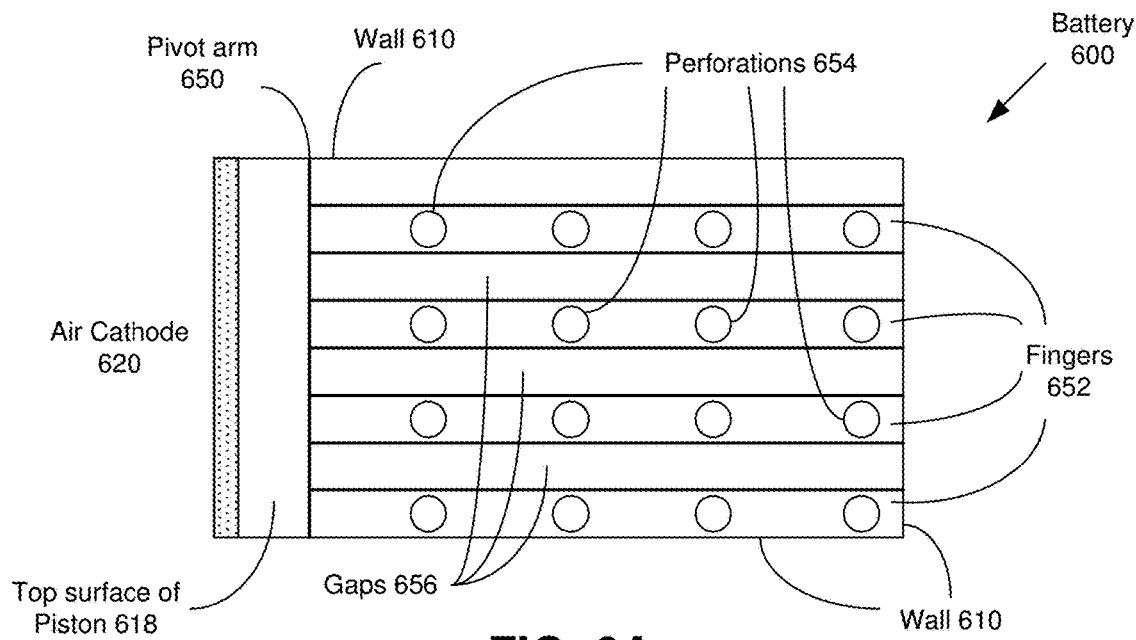
FIGS. 6A-B are top and front views of a refuelable electrochemical cell or battery, in accordance with some embodiments.
Figure 6B:
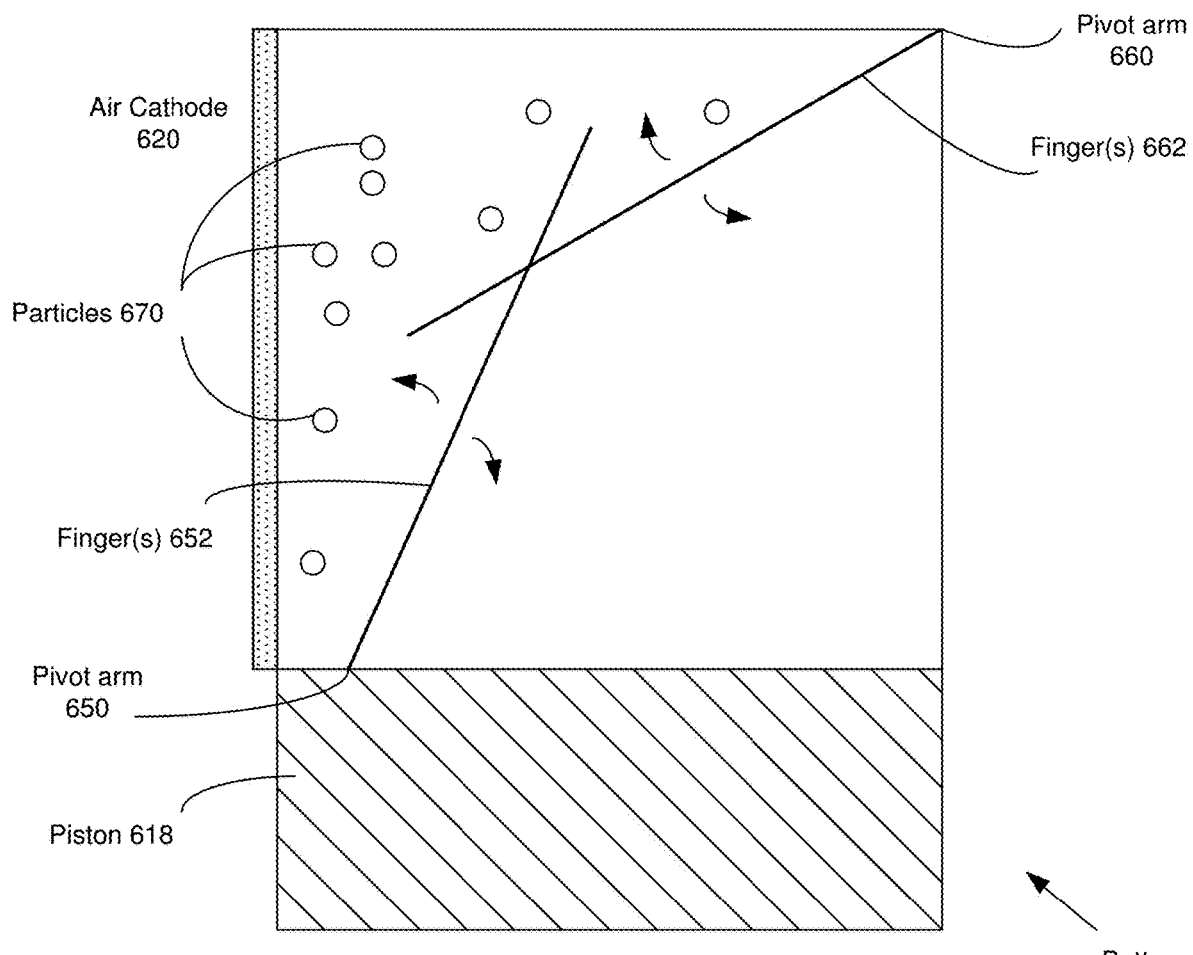

FIGS. 6A-B are top and front views of a refuelable electrochemical battery, according to some embodiments. In these embodiments, a collector comprises multiple interlocking or interlaced sweeps or combs for gathering electrochemically active particles. Together, the components filter the fuel mixture to mechanically gather the particles.

In these views, intake and exhaust ports are not shown, in order to more clearly illustrate the collector components. FIG. 6A provides a view of a first collector, anchored to the top of piston 618 by pivot arm 650 and comprising multiple rigid or semi-rigid fingers 652 separated by gaps 656. Each finger has one or more perforations 654, which may or may not be aligned with each other as shown in the figure.

During the power phase of operation of battery 600, and as shown in the front view of FIG. 6B, fingers 652 of the first collector interlace with fingers 662 of a second collector anchored to a wall 610 at pivot arm 660. In particular, fingers 662 of the second collector fit within gaps 656 of the first collector, and fingers 652 of the first collector fit within gaps of the second collector. The second collector may be virtually identical to the first collector except for its orientation. In the power phase, the collector components gather electrochemically active particles 670.

In some implementations, the collector components of battery 600 collect current that may be fed through pivot arms 650, 660, and may further be conducted toward a current collector located near cathode 620 (e.g., possibly separated by a suitable wettable insulator), perhaps via conductors embedded in one or more walls of the battery and/or the surface of piston 618.

Figure 5:
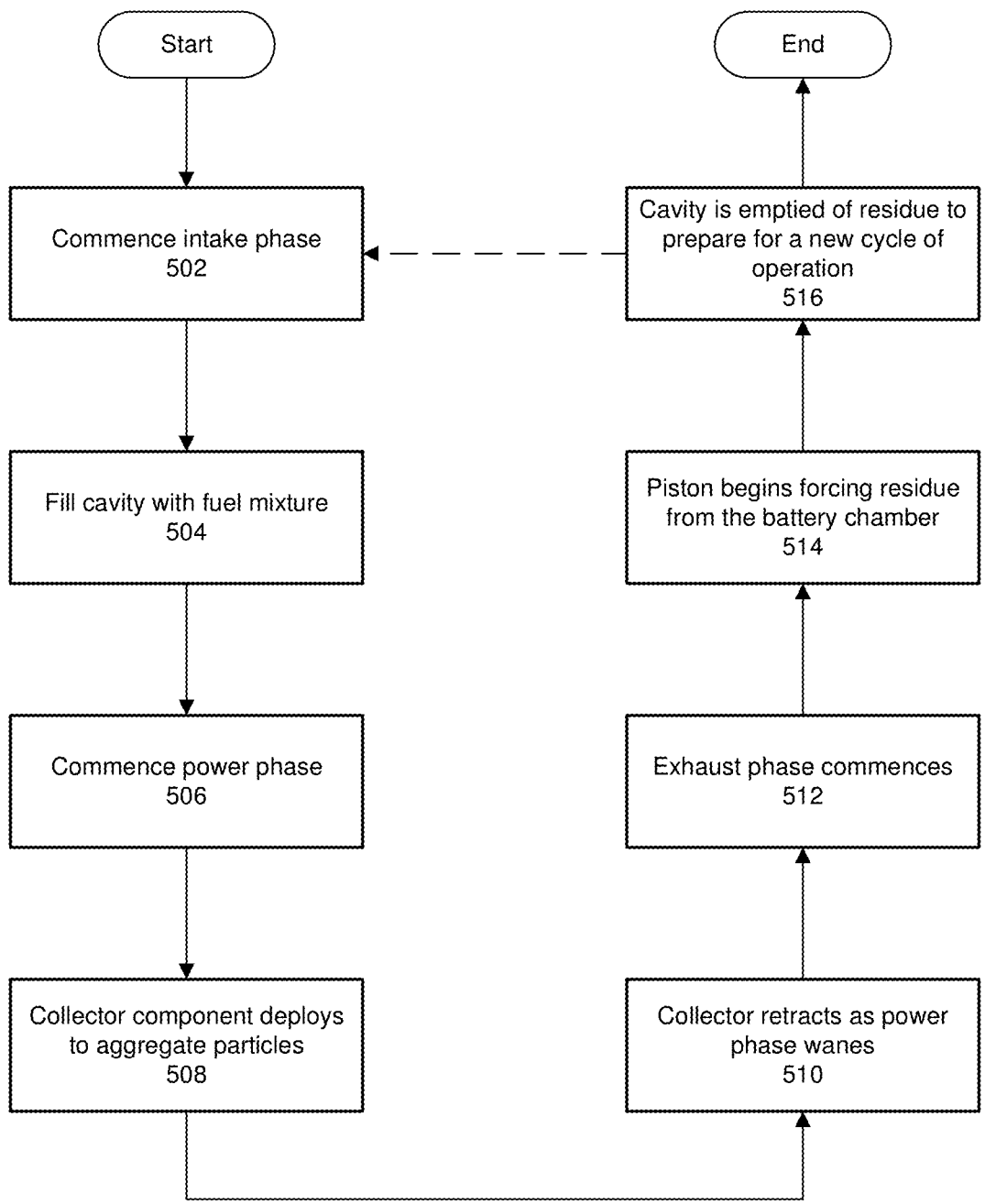
FIG. 5 is a flow chart illustrating a method of operating a refuelable electrochemical cell or battery, in accordance with some embodiments.

FIG. 5 is a flow chart illustrating a method of operating a refuelable electrochemical battery, according to some embodiments.

In operation 502, an intake phase commences. In some embodiments, this may entail opening a valve connecting a feed tube to the intake port and/or closing a valve in the exhaust port. For example, in some implementations, only the intake port or the exhaust port can be open at a given time (and either or both may be closed during the power generation phase). Illustratively, a single gate or lever may rotate or otherwise move from a position blocking the exhaust port (during the intake phase) to a position blocking both ports (during the power phase) to a position blocking the intake port (during the exhaust phase), and back again as needed.

In operation 504, a mixture of a suitable electrolyte and a suitable mass of electrochemically active particles or pellets is pumped into or drawn into the battery cavity. In some implementations, withdrawal of a piston may assist in the formation of a vacuum to help draw the fuel into the battery. A sensor may detect when the mixture has filled the cavity to a suitable level, the amount of mixture delivered may be measured as it is fed into the cavity, or some other mechanism may be used to determine when the cavity is sufficiently full and when the fuel flow should cease.

In operation 506, a power phase or stage of the battery's operation commences. This may occur even as fuel is still being added, or may occur after fuel delivery ceases (e.g., after the intake port is closed or blocked by an insulating obstruction).

In operation 508, during the power stage, one or more collector components mechanically force the electrochemically active particles together in order to facilitate the charge flow. The collector component(s) may extend and/or retract multiple times to gather particles that have not been spent, and/or to stir up the electrolyte to allow continuation of the electrochemical reaction, or may extend just once.

In some implementations, a collector component deploys incrementally to compact or combine the particles as they dissolve and shrink in size. For example, the collector may initially deploy or extend a significant distance and then pause when it encounters sufficient resistance (or reaches a predetermined degree or amount of extension). After some period of time (e.g., minutes) it may deploy further until again encountering sufficient resistance, and so on.

In operation 510, as the power output wanes (or when it ceases), the collector component(s) retract to their resting position. The resting position may be configured to accommodate the exhaust phase and the next intake phase.

In operation 512, the power phase ends as an exhaust phase commences. This operation may include opening the exhaust port or a valve or lever that had closed the port.

In operation 514, a piston begins extending longitudinally into the battery cavity to start forcing out the residue of the electrochemical reaction. In some embodiments, a distal end of the piston (external to the battery cavity) is coupled to a cam or other mechanism for transitioning between extending the piston into the battery cavity, withdrawing from the cavity, and resting in either or both the extended or withdrawn positions.

In operation 516, the cavity is (substantially) emptied of residue and the exhaust port or valve may be closed. After operation 516, the method may end or may return to operation 502 to begin a new cycle of operation.

The electrical energy output by a refuelable electrochemical battery or cell may be directly fed to an active load (e.g., to run an electrically powered vehicle, to power a piece of equipment). As one alternative, the output may be used to charge another battery or other electrical storage device and/or to provide power to conduct one or more phases of operation of another battery or cell.

A Refuelable Electrochemical Battery or Cell that Employs Magnetic Force

In some embodiments, particles included in a fuel mixture are gathered or collected using magnetism in addition to or instead of gravity and/or mechanical force. As with previously described embodiments, the particles may include pellets, flakes, grains, balls, lumps and/or other pieces of an electrochemically active substance (e.g., a metal). In some implementations the particles are homogeneously magnetic, in which case each particle consists purely or substantially of one or more magnetic metals, such as iron, nickel, cobalt, and ferritic steel. In other implementations they are heterogeneous and may, for example, feature a magnetic core and a non-magnetic coating or covering of aluminum, zinc, lithium or some other element or substance.

A refuelable cell or battery in these embodiments features an air cathode and an anode positioned between the fuel mixture and an electrically powered magnet (an electromagnet) and/or a permanent magnet. A magnet employed in these embodiments may or may not be in direct contact with the electrolyte, which may be aqueous or non-aqueous in different implementations. During the power phase of operation, the magnet attracts the particles to or toward the anode, thereby facilitating their oxidation and the flow of electrical charge.

In some implementations, the anode is or includes at least part of a wall of the cell, such as a wall opposite an air cathode (which may form part or all of another wall), and is in contact with the fuel mixture on one surface, while another surface faces or abuts the magnet(s), or may even comprise a surface of a magnet. The anode or anode current collector may include a mesh or other structure for collecting and conveying electrical charge to a corresponding terminal of the cell, and may be separated from the magnet by a material (e.g., plastic, glass, rubber) that is transparent to magnetic forces but that electrically separates or insulates the anode and the magnet. For example, in some implementations a wall of the cell or battery may be of an electrically non-conductive plastic (or other material), the anode may abut the wall within the cell's interior (e.g., within a recess of the wall or embedded in the wall), and the magnet may abut the exterior of the cell. In other implementations, the anode or anode current collector may be coupled to, connected to, or even part of the magnet, in which case magnetic forces may emanate from a location (or locations) closer to the fuel particles.

Assuming air (oxygen) is able to enter the battery or cell without limit through the air cathode, the capacity of the battery in embodiments described herein may generally be limited, at least in part, by the configuration of the anode and/or the magnet. Meanwhile, the size and/or shape of a magnet, and the magnitude of current supplied to the magnet (in the case of an electromagnet) may depend on factors such as the electrochemical particles to be attracted (e.g., their composition, size, shape, magnetic properties), the electrolyte (e.g., its viscosity) and how much resistance it will apply to the particles' movement, the shape and/or dimensions of the battery cell, the composition of the cell (e.g., plastic, metal), the configuration of the anode, whether the cell (or a vehicle or other entity in which the cell is situated) will be in motion, etc.

Therefore, the configuration of the magnet and the strength or force that it should provide will depend on the preceding factors and/or others. In other words, the pulling force, maximum energy product, surface field strength, flux density, field density or other measure of strength or force that allows a magnet or set of magnets to attract most or all electrochemical particles toward the anode may differ from one implementation to another.

Figure 7:
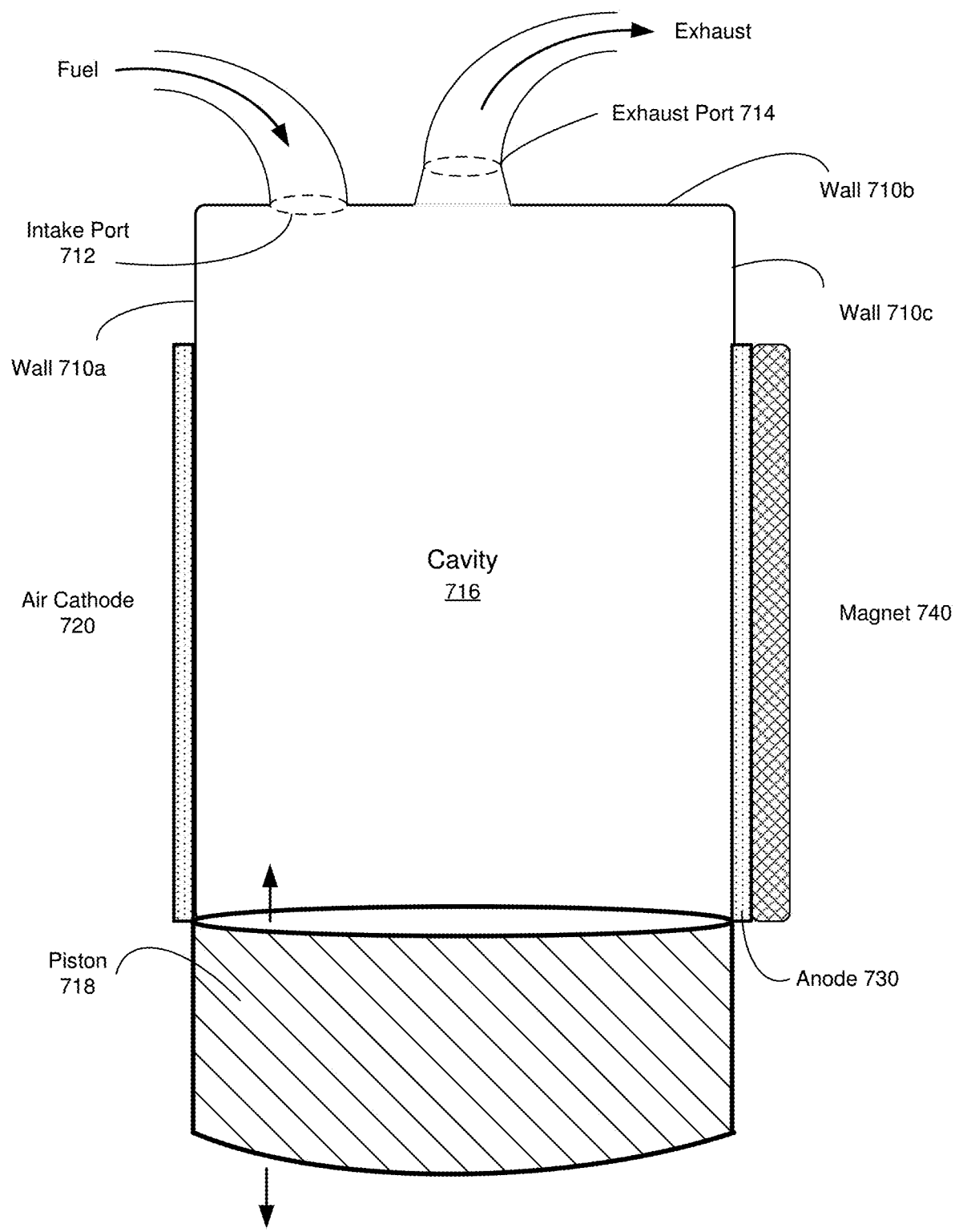
FIG. 7 is a front view of a refuelable electrochemical cell or battery, in accordance with some embodiments.

FIG. 7 is a diagram of a refuelable electrochemical cell or battery that employs magnetic force or forces, according to some embodiments.

In these embodiments, cell or battery 700 comprises cavity 716 defined by walls 710 (e.g., walls 710a, 710b, 710c), and is generally cylindrical in shape (e.g., with an ellipsoidal or circular cross-section). An intake phase of operation of cell 700 is marked by a flow of fuel into cavity 716 through intake port 712. Conversely, an exhaust phase is marked by the expulsion of residue through exhaust port 714. Piston 718 assists in the expulsion of the residue as described in previous embodiments.

Air cathode 720 enables oxygen from the air to enter cavity 716 to facilitate the necessary reduction and oxidation reactions. Cathode 720 may feature a blocking layer (e.g., Teflon®, Tyvek®) to prevent water from passing into or out of cavity 716, an active layer that features a suitable catalyst (e.g., manganese, cobalt, platinum, iron, activated carbon), and a separation layer (e.g., a microporous film). A current collector of the cathode (e.g., a metallic mesh or foam) may be part of the active layer or may be a separate layer.

One surface of anode 730 may be part of or embedded within wall 710c, while an opposite surface contacts magnet (or magnets) 740 or an electrical insulator that separates anode 730 and magnet 740. Magnet 740 is an electromagnet in the illustrated embodiments and receives power during operation of cell 700 from cell 700 or a different source (e.g., a different cell or battery). In some implementations, anode 730 and magnet 740 are combined in a single entity that features electrical separation between the two components.

In some alternative embodiments, magnet 740 is a permanent magnet. Because the magnet is continually active in these embodiments, piston 718 is configured to impart sufficient force upon residue within cavity 716 to expel most or all of the residue, meaning that it overcomes the force exerted by magnet 740 on any remaining particles within the residue. Illustratively, however, means may be provided to move or dislocate magnet 740 from the position shown in FIG. 7 at appropriate times (e.g., during an exhaust and/or intake stage). In some other embodiments, multiple magnets may be employed in place of a single magnet 740 and may include electromagnets and/or permanent magnets.

During the power phase of operation of cell 700 the magnetic electrochemically active particles within the fuel contained in cavity 716 are drawn toward anode 730 by magnet 740. As the particles oxidize, electrons are collected at the anode and their charge conveyed toward a terminal coupled to the anode. In some implementations, one or more portions of anode 730 may be situated on part of the surface of piston 718 (e.g., near wall 710c), as horizontal, vertical, or diagonal extensions of the anode, for example. In these implementations, heterogeneous particles whose magnetic portions have been oxidized may fall toward the piston where the non-magnetic portions may continue to oxidize.

Figure 8A:
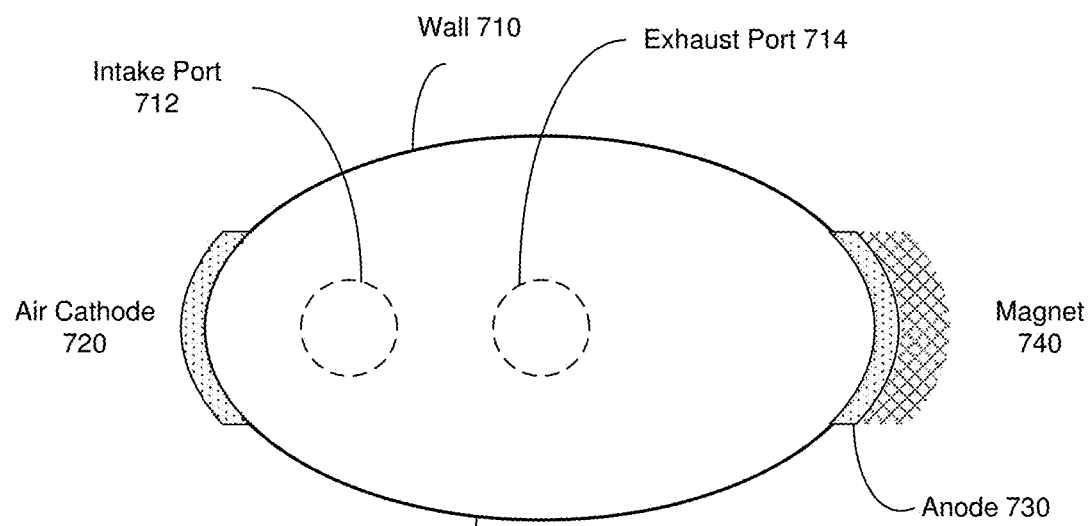
FIG. 8A is a top view of the refuelable electrochemical cell or battery of FIG. 7, in accordance with some embodiments.

FIG. 8A is a top view of the refuelable electrochemical cell or battery of FIG. 7, according to some embodiments. In these embodiments, air cathode 720 and anode 730 are of suitable dimensions to facilitate the rates of oxidation and reduction necessary to provide current for powering a load. For purposes of clarity, details such as positive and negative terminals, leads or conductors for powering magnet 740, conduits for delivering fresh fuel via port 712 and removing residue via port 714, and so on, are omitted. It should be noted that the locations, positions, and (relative) sizes/dimensions of cathode 720, anode 730, and magnet 740 are illustrative in nature and may differ to a small or large degree in other embodiments.

Figure 8B:
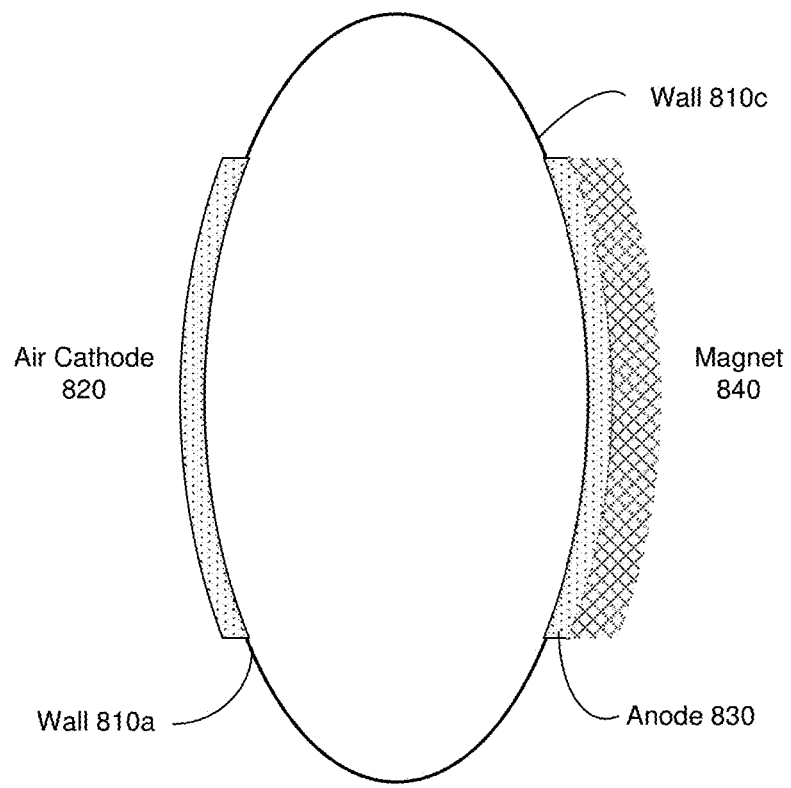
FIG. 8B is a top view of a refuelable electrochemical cell or battery, in accordance with some embodiments.

FIG. 8B is a top view of a refuelable electrochemical cell or battery, according to some embodiments. In these embodiments, the shape of the cell is similar to that depicted in FIG. 8A, but air cathode 820 and anode 830 are located on different walls, while still being of suitable dimensions to facilitate the rates of oxidation and reduction necessary to provide current for powering a load.

More particularly, the shapes of the cells in FIGS. 8A-B are ellipsoidal (when viewed from above or below). In FIG. 8A the cathode and anode are situated at the ends of the major axis of the ellipse, while in FIG. 8B they are located at the ends of the minor axis. By way of example, the minor axis in FIG. 8B may be on the order of a few centimeters in length in some implementations, but may be shorter or longer in others.

In different implementations, anode 830 and/or magnet 840 may abut or lie adjacent to any portion(s) of wall 810c, and therefore may be of various dimensions in width, height, and/or depth. Further, the composition and/or configuration of either component may depend upon the force (e.g., pulling force, field density, flux density) that the magnet should impart upon particles within the cell. For purposes of clarity, details such as positive and negative terminals, leads or conductors for powering magnet 840 (when it is an electromagnet), intake and exhaust ports, conduits for delivering fresh electrolyte and removing residue, and so on, are omitted.

Figure 9:
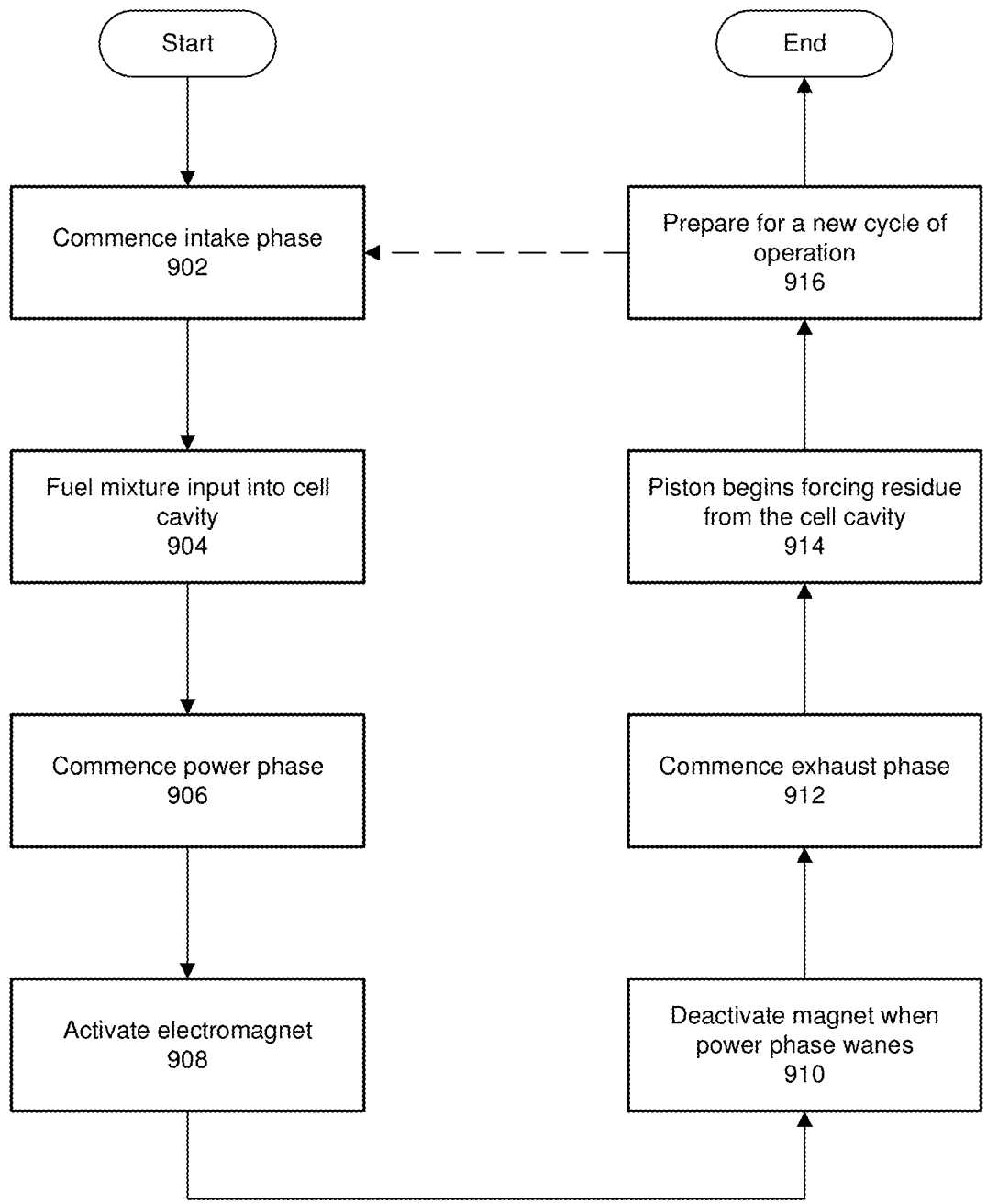
FIG. 9 is a flow chart illustrating a method of operating the refuelable electrochemical cell or battery of FIG. 7, in accordance with some embodiments.

FIG. 9 is a flow chart illustrating a method of operating the refuelable electrochemical cell or battery of FIG. 7, according to some embodiments. In these embodiments, some operations may be similar or identical to corresponding operations described above in conjunction with FIG. 5, while others may differ.

In operation 902, an intake phase commences and may proceed as described above. In particular, an intake port is opened and/or other action is taken to allow fuel to be introduced into the cell. This may include closing or blocking an exhaust port, retracting a piston or other means for facilitating the removal of residue, unblocking an air cathode, etc.

In operation 904, a mixture of an electrolyte and a suitable mass of electrochemically active pellets, flakes, grains, or other particles is delivered to the cell's cavity. In different implementations the components and/or composition of the fuel may differ. For example, different electrolytes may be used, which may be solid in nature (e.g., a powdered compound) or have a paste, liquid or gel consistency (e.g., ammonium chloride, potassium hydroxide, manganese dioxide). Similarly, and as mentioned above, the electrochemically active particles may be homogeneous or heterogeneous but are composed at least in part of a magnetic material.

In operation 906, a power phase of the battery's operation commences. This may occur even as the intake phase continues, or may occur after completion of the intake phase (e.g., when the intake port is closed or blocked). Non-magnetic portions of heterogeneous particles are subject to oxidation in the presence of the electrolyte during the power phase of operation. Magnetic portions of heterogeneous particles may or may not oxidize during the power phase, but homogeneously magnetic particles will oxidize.

In operation 908, an electromagnet is activated to begin drawing the particles of electrochemically active material to or toward the anode. In these embodiments, the magnet and the anode are sufficiently insulated from each other to prevent current flow between them, but without effectively impeding the magnetic force associated with the magnet. In some embodiments, the electromagnet may be activated on a continuous or pulsed basis, which may aid in settling of the electrochemically active particles. In the latter case, pulses may be uniform or may vary over time.

While the electromagnet continues to produce a magnetic field that draws the particles toward it and the anode, oxidation of the particles occurs and the resulting electrons produce an electrical charge that is conveyed to the cell's load via the anode and associated terminal. Corresponding reduction occurs at the cathode.

In operation 910, when the power output falls below a threshold (or when it ceases), the magnet is deactivated and remaining magnetic particles (or the magnetic portions of remaining particles) cease to be drawn toward it. However, current collection may continue at the anode if particles are still undergoing oxidation.

In operation 912, the power phase ends as an exhaust phase commences. This may include opening the exhaust port if it was closed or blocked.

In operation 914, a piston extends into the cell cavity to force out the residue of the electrochemical reaction. In some embodiments, evacuation of remaining magnetic particles may be assisted by strategically located magnets (that may or may not include the electromagnet that was active during the power phase). For example, a series of electromagnets may be successively or alternatingly powered to draw the remaining magnetic particles or particle fragments toward or even through the exhaust port.

In operation 916, the cell cavity is (substantially) emptied of residue and the exhaust port or valve may be closed. After operation 916, the method may end or may return to operation 902 to begin a new cycle of operation.

In some embodiments, the electrical energy output by a refuelable electrochemical battery or cell is directly fed to an active load (e.g., to run an electrically powered vehicle, to power a piece of equipment). In some other embodiments, the output is used to charge another battery or other electrical storage device and/or is used to provide power for conducting one or more phases of operation of another battery or cell. In particular, various operations described above for a given cell (e.g., opening or closing a port, powering an electromagnet, adjusting/moving a magnet, operating a piston) may be powered by a different cell or battery that is currently operating in its power phase.

Embodiments of a Refuelable Electrochemical Battery or Cell that Omit an Air Cathode In some embodiments, operation of a refuelable electrochemical battery or cell features the use of oxidized (or pre-oxidized) material and omits a gas-diffusion or oxygen-permeable membrane/cathode as described herein in association with other embodiments. A suitable cathode current collector may be situated in or along a wall of the cell or in some other location.

In these embodiments, the oxidized material is electronegative in comparison to the cell's fuel (i.e., the electrochemically active particles or mixture of the particles and an electrolyte) and therefore supports the reduction activity necessary to cause current flow. Oxidized material may be input to a cell separately from the fuel mixture, or may be combined with the fuel mixture prior to (or during) intake of the mixture.

The oxidized material may differ from one embodiment to another. In illustrative embodiments the material is or may include iron oxide, silicon dioxide, aluminum oxide, calcium carbonate, magnesium oxide, manganese oxide, sulfur trioxide crystals, and/or nitrogen dioxide.

In an illustrative embodiment in which the electrochemically active particles comprise aluminum (e.g., with a size in the micrometer and/or nanometer scale) and the electrolyte is potassium hydroxide, the corresponding oxidation half-reaction is $Al+3OH^-\rightarrow Al(OH)_3+3e^-$ and the corresponding reduction half-reaction is $O_2+2H_2O+4e^-\rightarrow 4OH^-$. This yields a total reaction in the form of $4Al+3O_2+6H_2O\rightarrow 4Al(OH)_3$. This illustrative embodiment yields approximately 1.2 volts potential difference in a given cell.

In some embodiments, a refuelable electrochemical cell that features oxidized material employs magnetism to combine the electrochemically active particles toward one current collector, as described above in a preceding section. In some other embodiments, mechanical force(s) are employed to gather the particles, as described in another preceding section.

In yet other embodiments, magnetic force(s) may be harnessed to attract the electrochemically active particles toward one (e.g., anode) current collector while mechanical force or forces may gather the oxidized material toward another (e.g., cathode) current collector. Or, the oxidized material (if magnetic) may be gathered via magnetism while the electrochemically active particles are combined mechanically.

Figure 10:
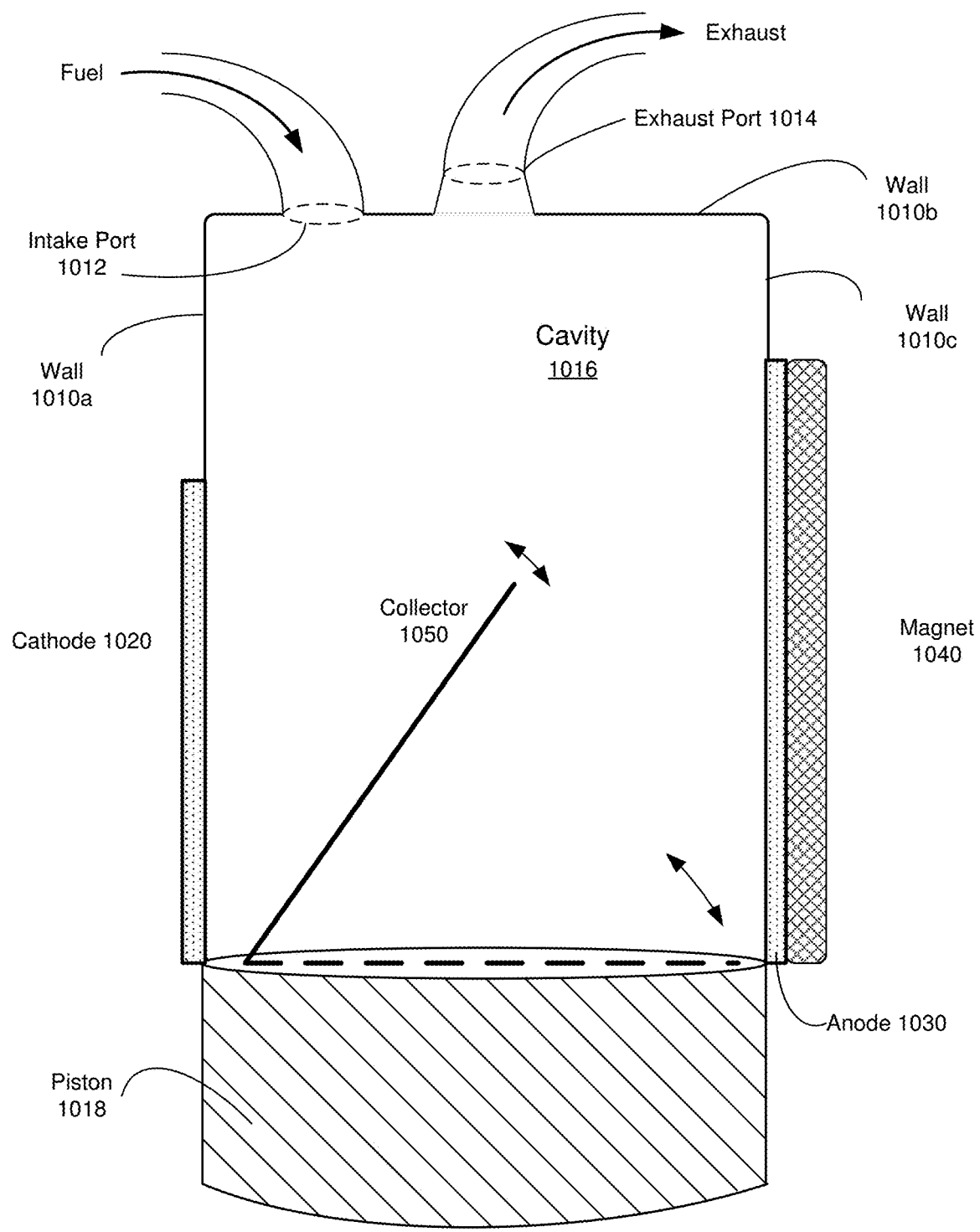
FIG. 10 is a front view of a refuelable electrochemical cell or battery, in accordance with some embodiments.

FIG. 10 is a diagram of a refuelable electrochemical cell or battery that employs magnetic and mechanical forces, according to some embodiments.

In these embodiments, after a fuel mixture containing an electrolyte, electrochemically active particles, and oxidized material is introduced into (or mixed within) cavity 1016 of cell 1000 (via intake port 1012), magnet 1040 (an electromagnet and/or permanent magnet) draws the particles toward anode 1030. Anode 1030 may form a portion of wall 1010*c* or be embedded in the wall.

The oxidized material, which may be in the form or shape of flakes, balls, lumps, etc., may be relatively large in size in comparison to the electrochemically active particles. Collector 1050 sweeps upward from a prone position (e.g., lying on the top surface of piston 1018) toward cathode 1020 to collect the oxidized material toward the cathode.

FIG. 10 provides an edge view of collector 1050, which may be perforated (e.g., similar to collector 130 of FIG. 3), or which may have the form or structure of a screen or filter that allows the electrolyte and electrochemically active particles to pass through, but not the oxidized material. Collector 1050 may act as a cathode current collector and/or gather the oxidized material toward the cathode, which includes a (or another) current collector. At or near the end of the power phase of operation of cell 1000, collector 1050 returns to the prone position.

In some illustrative embodiments, oxidized material used in place of an air cathode may comprise Ni—Co (nickel-cobalt) alloy oxide fragments, flakes, or pieces. In these embodiments, metallic ions diffuse outward and are oxidized when they encounter oxygen. A thin cobalt-rich oxide segregation layer is also formed and preserved on the outer wall of the shell. The size of the oxidized fragments may be in the range of nanometers to millimeters, depending on whether they need to be larger than the electrochemically active particles.

A Refuelable Electrochemical Battery or Cell with Laminated Fuel

In some embodiments, fuel for a refuelable electrochemical cell or battery is provided in the form of a laminated ribbon, film, or tape. Illustratively, the ribbon may comprise a flexible non-reactive and non-conductive base (e.g., of Mylar® or Tyvek®) upon which a layer or layers of one or more electrochemically active substances (e.g., a metal) are laid via coating, deposition, plating, and/or some other process.

An intake phase of operation of a cell in these embodiments involves advancing the ribbon so that an unused portion of the electrochemically active fuel (e.g., a "fuel patch") enters or is placed in contact with the cell (e.g., a cell cavity); fresh electrolyte may also be added to the cell as necessary during this phase. During the power phase, oxidation and reduction occur to produce a current to power the cell's load. During the exhaust phase, the used portion of the ribbon (which may contain remains of the fuel patch) exits the cell and used electrolyte may also be removed.

When the laminated fuel is positioned within or adjacent to the cell, it is located close to or in contact with a first electrode (e.g., the anode) of the cell, or a current collector for the first electrode. The other electrode (e.g., the cathode) may comprise an oxygen-permeable membrane as described elsewhere herein. In some embodiments, the laminated ribbon forms at least a portion of one wall of a cell.

In some implementations, the fuel ribbon is housed in a cassette-type apparatus for easy insertion and removal into the vehicle, device or mechanism in which the cell operates, in which case an unused portion of the ribbon is unwound from one spool of the mechanism while the used portion of the ribbon is wound onto another spool. In other implementations, other mechanisms may be employed. For example, a fuel ribbon may be installed on a single spool and, as fuel and electrolyte are used, the used portion of ribbon and electrolyte may be collected in a storage tank.

Means for advancing, winding, or unwinding the ribbon may include rollers, gears, cogs, and so on. For example, after installation of a cassette, rollers may grasp the ribbon to advance the ribbon, or gears may be placed into contact with perforations along one or both edges of the ribbon. In either case, rotation of the rollers/gears may be closely measured and controlled to ensure that each portion of laminated fuel is correctly positioned in or in contact with the cell. The rollers or other components that advance or move the ribbon may be controlled by a microprocessor or digital controller that is programmed with data necessary for accurate movement.

Part of the ribbon (e.g., a margin, the rear surface) may be encoded (e.g., optically or magnetically) for use by the processor or controller to help synchronize movement of the ribbon. Illustrative encoding may serve to indicate or identify fuel patches (e.g., the beginning and/or end of each patch), the number of fuel patches (e.g., how many remain, an ordinal number of a current patch), type of fuel (e.g., aluminum), length of the ribbon, distances (e.g., from the beginning and/or end of the ribbon), manufacturer, model number, serial number, etc.

Figure 11A:
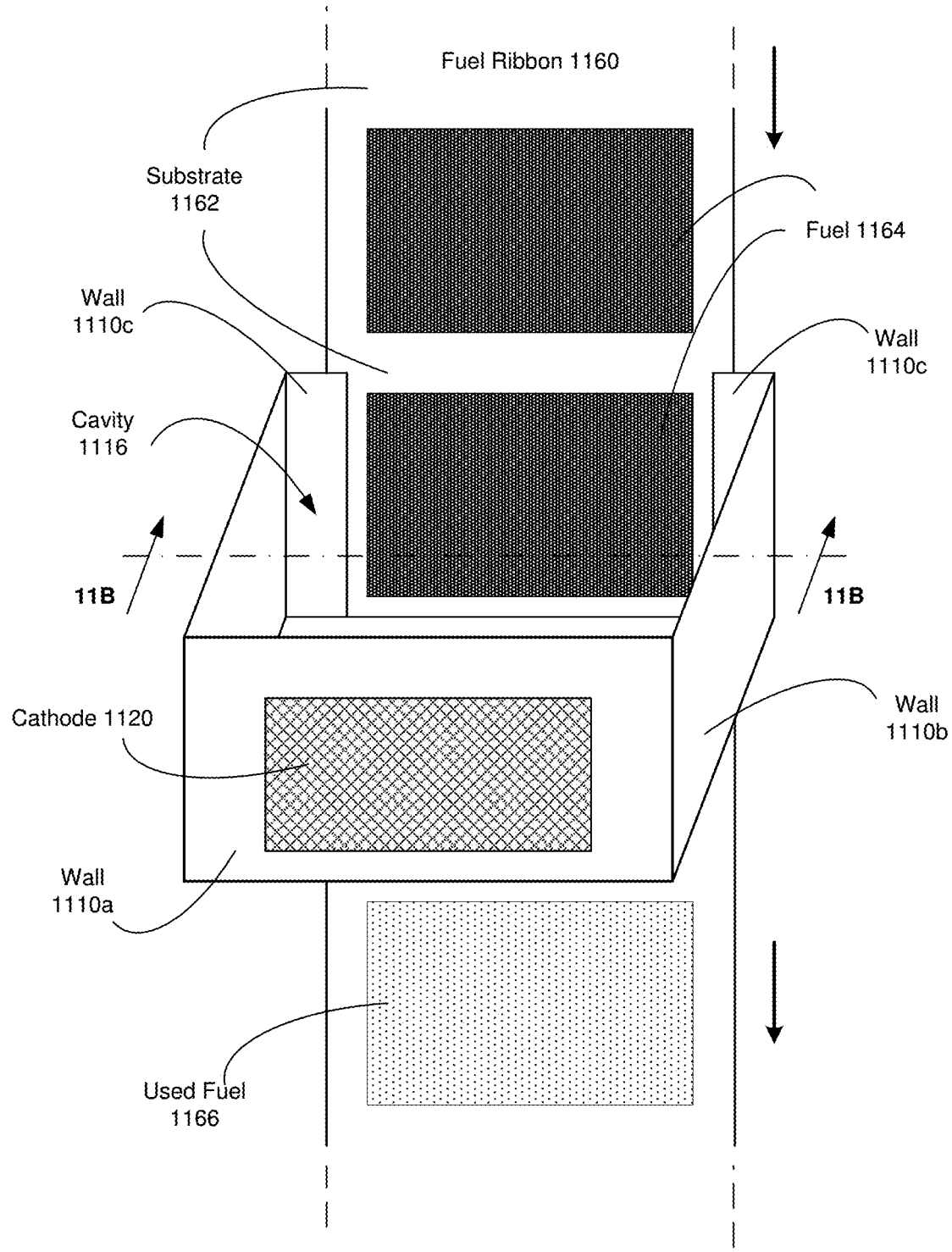
FIGS. 11A-C are views of a refuelable electrochemical cell or battery, in accordance with some embodiments.
Figure 11B:
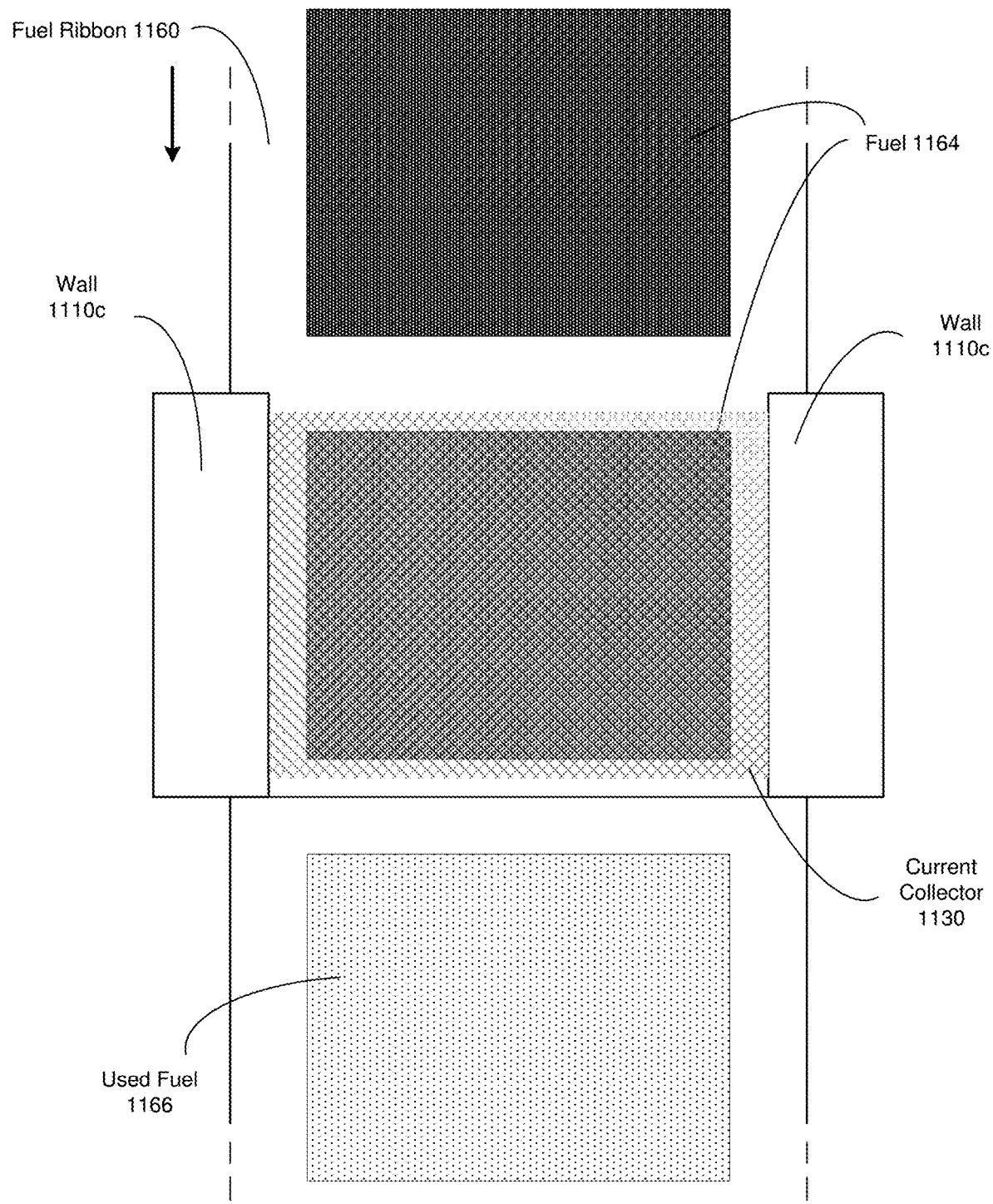
Figure 11C:
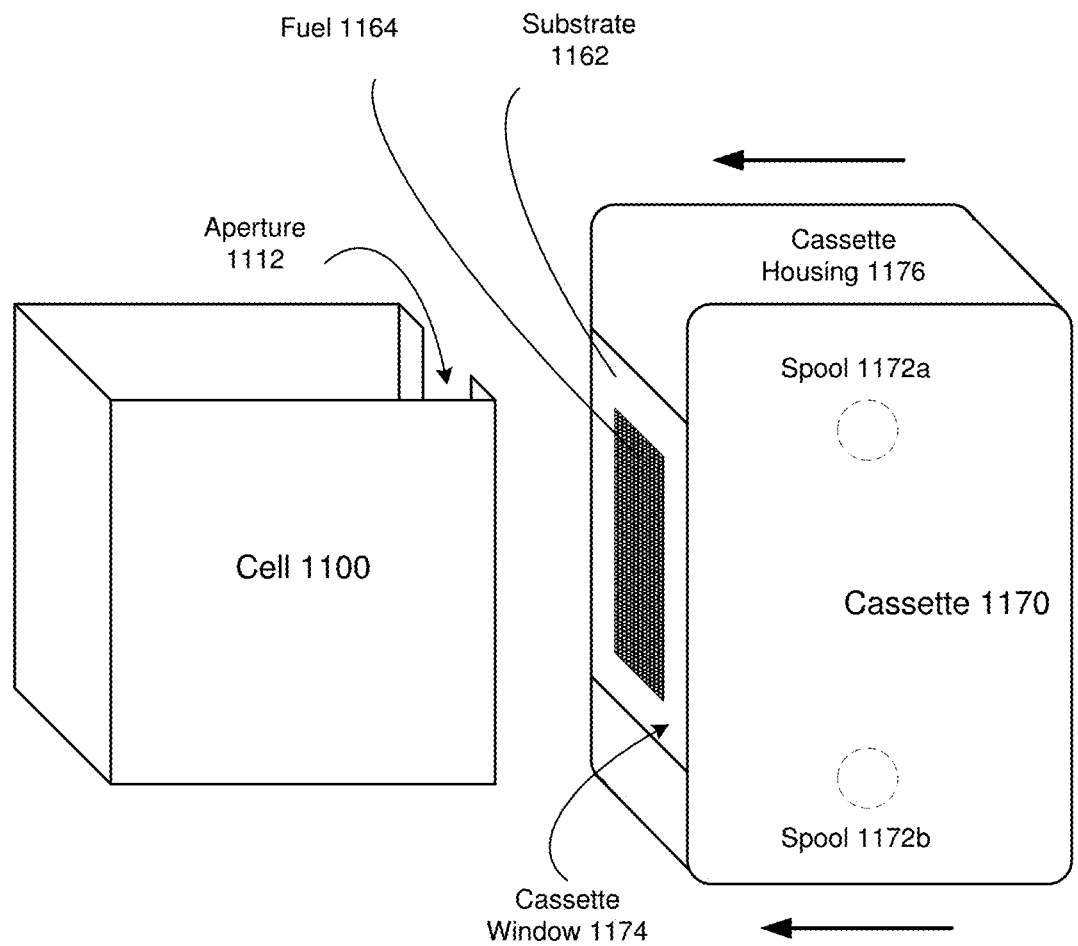

FIGS. 11A-11C are diagrams of refuelable electrochemical cells or batteries that feature a laminated fuel ribbon, according to some embodiments.

FIG. 11A is a perspective view of cell 1100 in which fuel ribbon 1160 forms a portion of a wall of the cell (e.g., the rear wall) during cell operation. Ribbon 1160 is composed of fuel 1164 and substrate 1162, which is non-conductive and does not significantly react with an electrolyte. In the illustrated embodiments, fuel 1164 is metallic (e.g., aluminum, zinc) and is laid in blocks, patches, lines, dots, and/or other patterns. Some or all of each fuel patch 1164 is consumed during the power phase of operation, as represented by used fuel patch 1166.

Cell 1100 includes other walls (e.g., walls 1110a, 1110b, 1110c), at least one of which includes air cathode 1120 to allow oxygen to enter cavity 1116. A top wall of cell 1100 is omitted in the interest of clarity. Also not shown in FIG. 11A are the anode, current collectors for the anode and cathode, conductors connected to the electrodes, means for adding and removing electrolyte, a microprocessor for controlling operation of the refuelable electrochemical cell, etc.

In the embodiments depicted in FIG. 11A, a cam, rotor, belt, spring, or other mechanism positioned behind fuel ribbon 1160 (from the point of view of FIG. 11A), or in some other location, presses or holds fuel ribbon against a rear surface of wall 1110 to hold the ribbon in place during the power phase of operation of cell 1100. For example, a cam having a known circumference may be used to promote accurate feeding of the ribbon between successive power phases. Also, or instead, fuel ribbon 1160 may feature perforations near one or both edges to enable one or more sprockets or gears to assist the advance of the ribbon, help maintain alignment of the ribbon relative to cell 1100, and/or for other purposes. Rear surfaces of wall 1110c may include one or more lips, guides, grooves, or other enhancements to help keep ribbon 1160 aligned with (e.g., in contact with) the cell. In the illustrated embodiments, the partial walls 1110c define an aperture between them for exposing fuel 1164 to cavity 1116 and electrolyte contained in the cavity.

FIG. 11B is a section view of a rear of refuelable electrochemical cell 1110, from the perspective indicated in FIG. 11A, and shows an illustrative form for a current collector for cell 1100. In the illustrated embodiments, current collector 1130 comprises a mesh or screen composed of conductive filaments for collecting current produced by the oxidation of fuel 1164, and is positioned between ribbon 1160 and cavity 1116 of the cell (shown in FIG. 11A). Current collector 1130 may couple to conductors embedded in wall 1110c to convey the current to a terminal of cell 1100 or a battery that includes cell 1100. Spaces or gaps between filaments of the current collector are large enough to allow the cell's electrolyte to contact fuel 1164.

In other embodiments, current collector 1130 need not be in the form of a mesh, but may instead comprise one or more conductive filaments of any dimension (length, width, thickness) arranged in any suitable orientation (e.g., horizontal, vertical, diagonal).

FIG. 11C depicts cassette 1170 containing a fuel ribbon for powering refuelable electrochemical cell 1100. Cassette 1170 includes spools 1172 for unwinding and winding the ribbon as its fuel is consumed. Illustratively, the part of the fuel ribbon wrapped around spool 1172a contains unused fuel patches or segments, one or more of which are introduced to cell 1110 during each cycle of operation of the cell. As the fuel ribbon is unwound from spool 1172a, the part of the fuel ribbon containing used fuel patches is wound upon spool 1172b. Cassette 1170 also includes a housing 1176 that substantially encloses the fuel ribbon, except for cassette window 1174, which provides an opening or aperture for exposing to cell 1100 a limited number or amount of fuel patches at a time (e.g., one, two).

In particular, at least one fuel patch at a time is exposed to aperture 1112 of cell 1100, and may block the aperture or be situated adjacent to the aperture, so that electrolyte contained in the cavity can contact the patches.

The horizontal arrows in FIG. 11C indicate that, during installation, cassette 1170 is brought adjacent to or in contact with a portion of the cell comprising an open wall. Cassette 1170 may be maintained in position (e.g., with the fuel ribbon contacting the wall of cell 1100) in different ways in different embodiments. For example, installing the cassette such that spools 1172 mate with corresponding hubs or spindles may automatically place the cassette into proper alignment with the cell. The hubs may be considered part of a device that includes cell 1100.

As one alternative, cell 1100 (or cassette 1170) may feature one or more latches that grasp the cassette (or the cell) during installation and that release during replacement of the cassette. As another alternative, a bottom (or top or side) of the cassette may include rails, slots, or other mechanical means for guiding the cassette into position along corresponding slots, rails, or other cooperative means associated with cell 1100.

In some embodiments, however, a bottom portion of cassette 1170 may be substantially open so that, as used portions of the fuel ribbon are wound upon spool 1172b, electrolyte that may adhere to the ribbon can fall off due to gravity or be scraped off as the ribbon passes a ledge or other mechanism specifically located or oriented for this purpose. A waste tank or storage tank may be located beneath cassette 1170 (and cell 1100) to contain used electrolyte. The tank may also receive the used portions of the fuel ribbon, in which case spool 1172b may be omitted.

In these embodiments, a bottom surface of cell 1100 may be hinged at one or more edge and open downward to facilitate removal of used electrolyte during the exhaust phase of operation. After the exhaust phase, the bottom surface closes and during the following intake phase fresh electrolyte is added to the cell's cavity (e.g., from a storage tank) and a new cassette 1170 is installed. The fuel ribbon may advance multiple times and multiple fuel patches may be used before the cell's electrolyte is expelled and fresh electrolyte added.

In some embodiments, a single cassette may house multiple laminated fuel ribbons and operate in conjunction with multiple cells simultaneously. For example, cassette 1170 of FIG. 11C may have dimensions that allow it to house and feed a single ribbon. Alternatively, cassette 1170 may be significantly wider or thicker, such that spools 1172 support the unwinding and winding of multiple ribbons side-by-side.

In these embodiments, the cassette may feature partial internal walls to separate the fuel ribbons, and multiple cams or sets of rollers, gears, or other means for advancing the ribbon. All ribbons may advance the same amount at the same time, thereby synchronizing the operations of multiple corresponding cells.

Mechanisms for loading/unloading or mounting/dismounting a cassette may be similar to those employed for videocassette recorder tapes, audio cassette tapes, and so on. For example, a capstan or spindle for holding a cassette and facilitating advancement of a fuel ribbon may pivot or rotate to accept insertion of the cassette, then return to an operating position. Similarly, advancement and/or rewinding of a ribbon may be aided or driven in a manner similar to such devices. For example, advancement of a fuel ribbon may involve digital control of a servo mechanism that drives the capstan or spindle. One or more pinch rollers, tape guides or pins, and/or other components may help control movement of the fuel ribbon.

In some embodiments, a used cassette may be uninstalled or removed, and a fresh or new cassette installed, automatically. For example, a vehicle or other entity in which cell 1100 operates may be outfitted with a cassette system that automatically ejects (and stores) a used cassette and installs a new one in its place.

It should be understood that the exemplary embodiments described above and/or depicted in the accompanying drawings are merely illustrative, and that mechanical and/or magnetic means and mechanisms that are employed in these and/or other embodiments may be configured differently (e.g., in terms of orientation, position, location, size, and/or other characteristics) without departing from the scope of what is claimed.

Further, in the preceding description 'some embodiments,' 'one or more embodiments,' and so on, refer to subsets of all possible embodiments, and may sometimes (but not necessarily always) specify the same subset(s) of embodiments.

An environment in which some embodiments of the invention are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Methods and processes described in the detailed description can be embodied as code and/or data, which can be stored in a non-transitory computer-readable storage medium as described above. When a processor or computer system reads and executes the code and manipulates the data stored on the medium, the processor or computer system performs the methods and processes embodied as code and data structures and stored within the medium.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. In particular, it should be understood that the exemplary embodiments described above and/or depicted in the accompanying drawings are merely illustrative, and that mechanical and/or magnetic means and mechanisms that are employed in these and/or other embodiments may be configured differently (e.g., in terms of orientation, position, location, size, and/or other characteristics). The scope of the invention is defined by the appended claims, not the preceding disclosure.

What is claimed is:

1. An electrochemical cell, comprising:
an intake port through which a fuel mixture is admitted into the cell;
an oxygen-permeable cathode;
an anode;
an exhaust port; and
a magnet.

2. The electrochemical cell of claim 1, wherein:
the oxygen-permeable cathode forms a portion of a wall of the cell; and
the anode is positioned between the magnet and the fuel mixture.

3. The electrochemical cell of claim 1, wherein the fuel mixture comprises:
an electrolyte; and
multiple particles that are at least partially magnetic.

4. The electrochemical cell of claim 3, wherein one or more of the particles comprise:
a magnetic portion; and
a non-magnetic portion.

5. The electrochemical cell of claim 3, wherein each of the particles comprises one or more magnetic metals.

6. The electrochemical cell of claim 3, wherein:
the multiple particles comprise aluminum; and
the electrolyte comprises one of sodium hydroxide and potassium hydroxide.

7. The electrochemical cell of claim 3, wherein:
the magnet is an electromagnet; and
when powered, the magnet attracts the multiple particles toward an anode situated between the fuel mixture and the magnet.

8. The electrochemical cell of claim 3, wherein the electrolyte and the multiple particles are mixed prior to admission of the fuel mixture into the cell.

9. The electrochemical cell of claim 3, wherein the electrolyte and the multiple particles are mixed during the intaking of the fuel.

10. The electrochemical cell of claim 3, wherein the magnet is a permanent magnet.

11. The electrochemical cell of claim 10, further comprising means for increasing a distance of the magnet from the electrolyte.

12. The electrochemical cell of claim 1, further comprising:
a piston;
wherein the piston traverses the cell to eject, through the exhaust port, residue of an electrochemical reaction within the cell.

13. A method of operating an electrochemical cell, the method comprising:
admitting electrochemically active particles and an electrolyte into the cell;
causing the electrochemically active particles to be magnetically attracted toward a first current collector;
drawing electrical current from the cell; and
expelling from the cell residue resulting from oxidation of the particles.

14. The method of claim 13, further comprising:
repeating said admitting, said causing, and said expelling for multiple cycles.

15. The method of claim 13, wherein said admitting comprises:
mixing the particles and the electrolyte as they are admitted to the cavity.

16. The method of claim 13, wherein:
said collecting comprises applying power to an electromagnet; and
the first current collector is located between the electromagnet and a mixture of the particles and the electrolyte.

17. The method of claim 13, wherein:
an oxygen-permeable cathode comprises a second current collector.

18. The method of claim 13, wherein:
a first wall of the cell comprises the first current collector; and
a second wall different from the first wall comprises a second current collector.

19. The method of claim 13, wherein said expelling comprises:
mechanically forcing the residue through an exhaust port.

20. The electrochemical cell of claim 1, wherein the fuel mixture comprises one or more magnetic metals.

* * * * *